Aug. 11, 1931.　　　　　S. SCHIFF　　　　　1,818,277
BALLER
Filed Dec. 10, 1928　　　3 Sheets-Sheet 1

Inventor
Sigmund Schiff

Aug. 11, 1931.  S. SCHIFF  1,818,277
BALLER
Filed Dec. 10, 1928   3 Sheets-Sheet 2
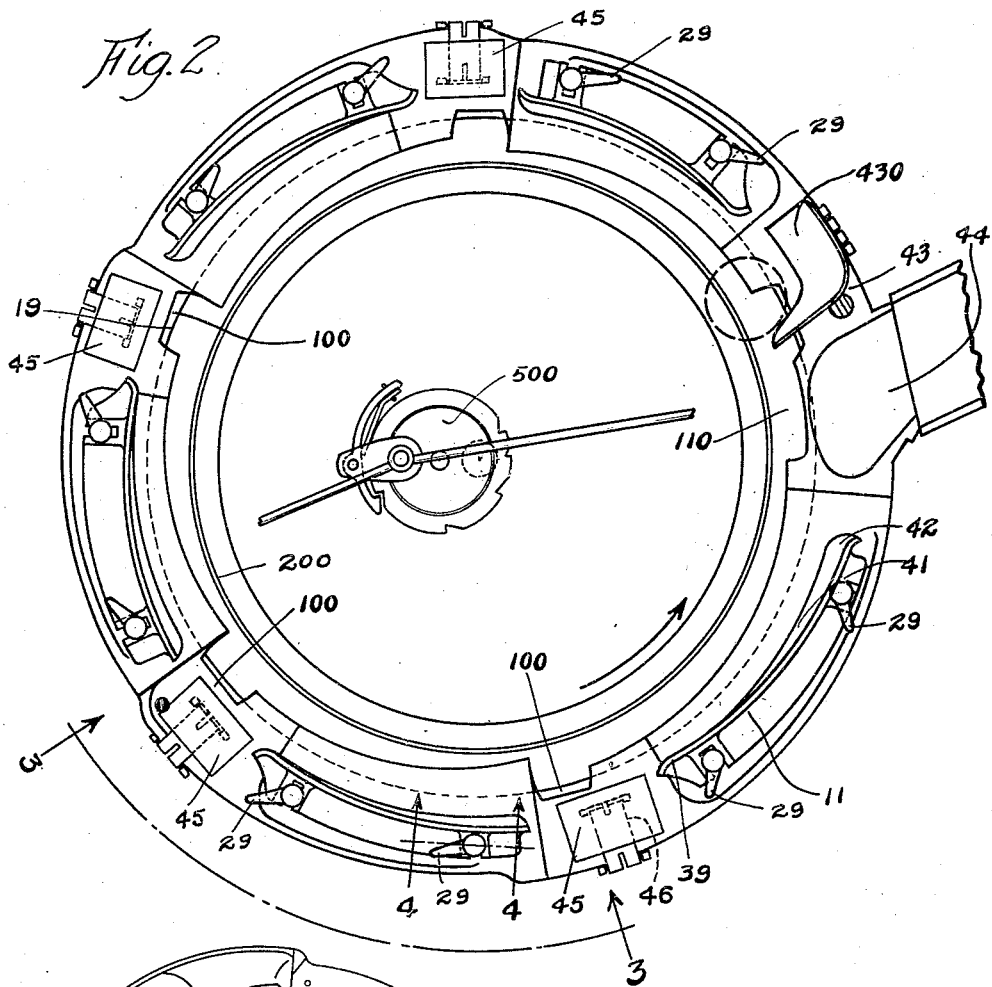
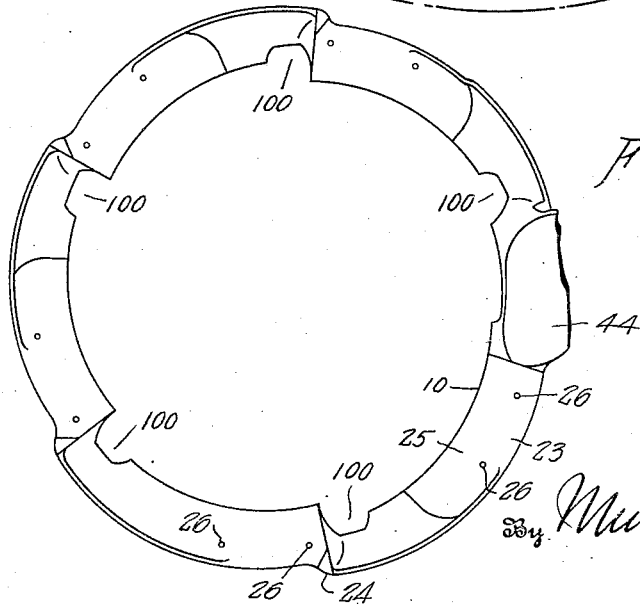
Inventor
Sigmund Schiff
By Murray Gugelter
Attorneys.

Aug. 11, 1931.   S. SCHIFF   1,818,277
BALLER
Filed Dec. 10, 1928    3 Sheets-Sheet 3

Inventor
Sigmund Schiff
By Murray ud Rugelter
Attorneys.

Patented Aug. 11, 1931

1,818,277

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

BALLER

Application filed December 10, 1928. Serial No. 324,813.

This invention relates to a rotary baller for use in the development of individual lumps of dough into ball form and with a skin thereover and has for an object the provision of a simple and readily adjustable means whereby the device may be adjusted to accommodate lumps of dough of different sizes and to regulate the action of the baller upon the dough.

These and other objects are attained by the means described herein and disclosed in the accompanying drawings, in which:

Fig. 2 is a view taken on line 2—2 of Fig. 1.

Fig. 5 is a plan view of a part forming a detail of the invention.

Figure 1:
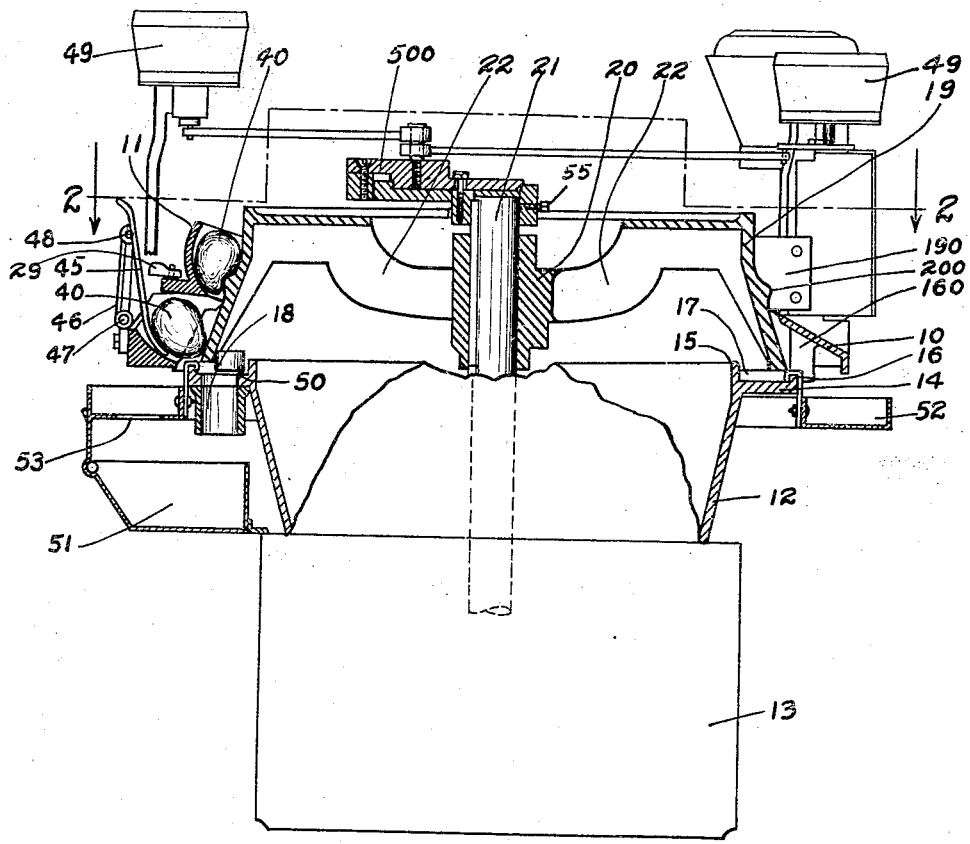
Fig. 1 is an elevation view, partly in cross section showing a structure embodying the present invention.
Figure 3:
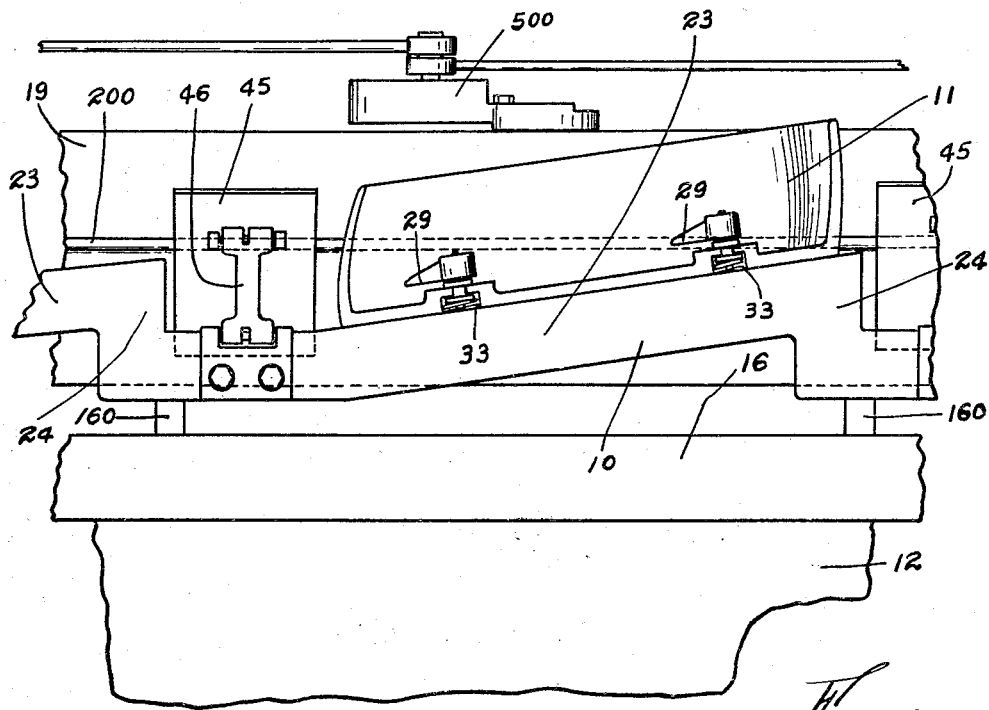
Fig. 3 is an enlarged detailed view taken on line 3—3 of Fig. 2.
Figure 4:
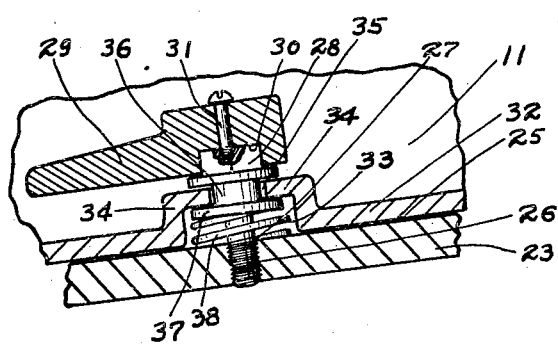
Fig. 4 is a view taken on line 4—4 of Fig. 2.

The device of the present invention comprises a pot structure or kneading ring which is made up of a supporting ring 10 and adjustable kneading plate members 11 supported on inclined surfaces 25 thereof. The support frame 12 may be mounted upon a suitable housing 13 within which actuating and power means (not shown) for the device may be housed. The frame 12 has an annular flange 14 with a pair of spaced upstanding rings 15 and 16 extending therefrom and providing an annular groove or channel 17 the base of which has a single discharge opening and spout 18 therein, the purpose of which will be hereinafter explained. A kneading wheel 19 comprises an annular sloping member 19 having a central hub 20 suitably secured to the power driven shaft 21. Webs or spokes 22 connect the ring 19 and hub 20. The wheel 19 has an annular rib or bead 200 which is disposed intermediate the top and bottom of said wheel and preferably parallel thereto. The ring 10 is supported at intervals by legs 160 upon the upstanding outer flange 16. As is best seen in the enlarged fragment in Fig. 3 the ring 10 comprises a series of upwardly inclined portions 23 connected by vertical portions 24 so as to make an annular saw tooth-like structure. The upper plane inclined faces 25 of the portions 23 are each provided with a pair of threaded perforations 26 for receiving clamping screws 27 for the adjustable kneading plate members 11. The clamping screws are arranged for quick manual tightening and loosening without the aid of tools by providing an angular head 28 on the screws 27 and mounting thereover a handle 29 having a suitable socket 30 for receiving the head 28. Any suitable means such as a screw 31 serves to preclude separation of the handle 29 and the adjusting screw 27. The kneading plate members indicated generally as 11 have substantially an L formation in cross section and comprises a base flange 32 which has a pair of transverse slots or recesses 33 extending part way across it and a pair of inverted L-shaped flanges 34 overhanging the edge of the slot 33 forming a way 35 between which a suitable shoulder 36 on tightening screw 27 may extend. The shoulder 36 abuts a washer 37 disposed within the slot 33 and abuts the compression spring 38 which surrounds the screw. By providing a pair of slots in each of the kneading plate members 11 it is possible to adjust the kneading plate member on the supporting face and to thereupon turn the handle 29 in order to tightly clamp the kneading plate members in adjusted positions. The spring tension holds the screws against turning movement, so that they may be loosened or tightened on plates 11 by a one-half turn.

Especially referring now to Fig. 2 it will be noted that the upstanding walls 11 of the kneading plate members are somewhat arcuate on the working face and that one end 39 overhangs somewhat in the direction of the kneading wheel 19 in order to receive a lump or ball of dough such as 40 which has just dropped down over the stepoff formed by the vertical portion 24 on ring 10. However for some of the stiff kinds of dough the working face of the plate may be made flat. The plate 11 is longitudinally arcuate and has an upward helical lead 41 so that its end 42 flares oppositely at the end 39. Each plate, when suitably arranged about the ring 19 thus affords a constant rolling and kneading action on a ball of dough and a subsequent release thereof to permit it to be similarly acted upon by a succeeding plate, but on a different axis.

It is to be noted that either end of the plate as well as the entire plate may be adjusted toward or away from wheel 19, independently of the other plates, so that the device may be arranged to exert just the desired pressure on a ball of dough of any kind or consistency.

A suitably mounted baffle 43 provides on its one side a receiving or starting chute 430 for a lump of dough and its opposite side assists in directing a finished ball into discharge chute 44.

Between each adjacent pair of plates 11 there is mounted on ring 10 an adjustable pocket plate 45 which insures the proper transitory passage of the dough 40 from one plate 11 to the succeeding one. Adjustment and mounting for these members is conveniently formed by means of brackets 46 pivotally adjustable at 47 and has the pocket plates 45 thereon at 48. Ordinary clamping bolts may be used at 47 and 48. Bracket 46 is split for frictional tension, and plate stays wherever put.

These pocket plates have a compound curve on the front faces thereof so that lumps of dough of various weights will engage this face at some elevation above the bottom thereof. The lump of dough will also roll on the ring 10 at this time. The adjustment of the pocket plates may be made bodily toward and away from the kneading wheel as well as angularly about the upper horizontal mounting axis so that the dough may fall to the bottom and engage the kneading plate at bottom of 39.

It will be noted that the pocket plates are mounted adjacent the openings 100 in the ring 10 so that any possible scrap may drop therethrough. This scrap is collected in the trough or pan 52. A normally non-contacting scraper 190 is provided with an adjacent scraping edge conforming to the contour of outer face of wheel 19. A touch of the operator's hand moves the scraper into operative contact with the wheel for liberating any adhering flour and dough and discharging it without mixing it with the lumps operated upon.

This intermittent release of pressure on the lump of dough has a beneficial effect on its quality, and in the act of dropping the dough lump turns over on a different axis upon which axis it then turns as the lump travels through and is subjected to the pressure and rolling by the succeeding kneading plate 11.

Any suitable type of flouring device may be employed with the device of the invention which is conveniently adapted to utilize a device as shown at 49 actuated by an adjustable eccentric means 500 mounted on the shaft 21.

As a lump of dough such as 40 is rolled about the series of kneading plates by the action of the kneading wheel, some scrap may be liberated together with particles of flour. These may fall beneath the kneading wheel. The channel 17 however in this embodiment of the invention receives such particles which are swept along the channel by a scraper or brush 50 attached to the wheel and serving to carry them along to discharge spout 18 from which they drop into a suitable collecting box or receptacle 51. An outer annular tray 52 having a discharge opening at 53 over box 51 serves to collect such particles as may tend to drop clear of the wheel 19. This outer tray, being readily accessible may be cleared manually from time to time.

The operation of the device will be readily understood. With wheel 19 rotating under suitable power, lumps of dough are successively entered through receiving chute 430 whereupon the action of the wheel begins to roll each lump about a substantially vertical axis so that it is uniformly acted on by the combined action of the wheel and the kneading plate member 11 adjacent the chute. The lump travels up the incline as it rolls along the kneading plate so that rib 200 on the wheel effects a compressing action on the entire surface of the lump of dough as it travels along the plate. When the lump or ball of dough reaches the end of one plate 11 it tumbles end over end axially into the space between pocket plate 45 and wheel 19. At this moment the lump is relieved of pressure and travels over the flattened portion of ring 10 to the adjacent end of the next succeeding kneading plate when it is again acted upon. The lumps of dough are entered successively into the receiving chute and are each subjected to the alternate rolling under pressure and release of pressure by the series of kneading plates and intermediate pockets from which they pass to the discharge chute 44. The sifter or duster means 49 provide the required dusting of flour at suitable intervals so that the lumps of dough will not tend to stick to the wheel, plates or pocket members. In course of their travel through the baller, the rolling and pressure is effected uniformly to all parts of the lump and the desired skin is developed on the outer surface thereof.

What is claimed is:

1. A rotary baller comprising a fixed ring having a top face provided with a series of upwardly inclined portions with laterally extending apertures therein, a substantially L-shaped kneading plate member on each of said inclined portions, means extending through the kneading plates and into said lateral apertures for effecting adjustment of said kneading plate members and a kneading wheel rotatably mounted within the ring and providing together with the kneading plate members, a passage for the movement of dough.

2. In a device of the class described a ring like base having a series of inclined faces extending about one side thereof, a clamping device mounted adjacent each end of each of said faces, and a series of upstanding kneading plate members disposed on said faces and having slots therein for receiving the clamping means.

3. In an adjustable rotary baller the combinaiton of a stationary ring member having an inclined face thereon, a kneading plate having a transversely slotted base flange disposed for rigid mounting on the inclined face and clamping means extending from the face and through the slot in the base flange for clamping the kneading plate member in various positions on said face.

4. An adjustable rotary baller comprising a rotary upstanding kneading wheel, a fixed concentric ring and independently adjustable kneading plate members comprising arcuate upstanding plates adapted for positioning in a generally circular relation about the kneading wheel, the plates being adjustable toward and away from the wheel in pivotal and bodily relation.

5. In an adjustable rotary baller the combination of a rotary kneading wheel, a fixed ring having a series of inclined plane faces disposed concentrically and in substantially circular relation about the kneading wheel, and a series of kneading plates of arcuate formation adjustably mountable on the inclined faces.

6. In a device of the class described the combination with a rotary kneading wheel, of a ring surrounding the wheel and having a series of spaced faces disposed in a horizontal plane and a series of uniformly inclined faces disposed intermediate the first mentioned faces, a pocket plate mounted for adjustment over each of said first mentioned faces and adjustable kneading plates mounted on the inclined faces.

7. The combination with a rotary kneading wheel, of a series of spaced inclined kneading plates disposed around the wheel and pocket plates disposed intermediate adjacent kneading plates and arranged for angular and bodily adjustment relative to said kneading wheel.

8. In combination a ring having spaced faces in a common plane, inclined faces interposed between said first mentioned faces, kneading plates adjustably mounted on the inclined faces, pocket plates adjustably mounted adjacent the ends of the kneading plates and a rotary member disposed within the ring and co-operating with the plates to effect pressure and turning of a lump of dough and intermittent release of pressure.

9. In a device of the class described the combination of a ring having spaced faces in a common plane, kneading plate supporting faces interposed between said first mentioned faces, kneading plates adjustably mounted on the said plate supporting faces, pocket plates adjustably mounted intermediate the kneading plates, and a rotary member disposed within the ring and cooperating with the plates to effect pressing and turning of a lump of dough and intermittent release of pressure.

In testimony whereof, I have hereunto subscribed my name this 30th day of November, 1928.

SIGMUND SCHIFF.